(12) United States Patent
Clark

(10) Patent No.: US 7,500,794 B1
(45) Date of Patent: Mar. 10, 2009

(54) CONCEALED VEHICULAR CAMERA SURVEILLANCE SYSTEM

(76) Inventor: Karen G. Clark, 1015 S. Waco, Weatherford, TX (US) 76086

( * ) Notice: Subject to any disclaimer, the term of this patent is extended or adjusted under 35 U.S.C. 154(b) by 335 days.

(21) Appl. No.: 11/441,723

(22) Filed: May 27, 2006

(51) Int. Cl.
*G03B 17/00* (2006.01)
(52) U.S. Cl. .................. 396/427; 348/143; 348/148
(58) Field of Classification Search .............. 396/427; 348/143, 148, 207.99
See application file for complete search history.

(56) References Cited

U.S. PATENT DOCUMENTS

| 6,583,730 | B2 * | 6/2003 | Lang et al. ................ 340/905 |
| 2002/0003571 | A1 * | 1/2002 | Schofield et al. ............ 348/148 |
| 2005/0190082 | A1 * | 9/2005 | Kumata et al. ........... 340/995.1 |
| 2006/0170770 | A1 * | 8/2006 | MacCarthy ................ 348/148 |

* cited by examiner

*Primary Examiner*—W. B. Perkey
*Assistant Examiner*—Warren K Fenwick

(57) ABSTRACT

A concealed vehicular camera surveillance system that is mounted in both an internal rearview mirror and in an external side view mirror of a motor vehicle to prevent detection and to provide effective surveillance recorded on a video recorder.

7 Claims, 5 Drawing Sheets

CONCEALED VEHICULAR CAMERA SURVEILLANCE SYSTEM

FIELD OF THE INVENTION

The present invention generally relates to a vehicle-mounted surveillance system and more particularly, relates to a vehicle-mounted surveillance system that is concealed in the external side view mirror and the internal rearview mirror.

BACKGROUND OF THE INVENTION

People working in the security business, either in the private sector such as private detectives, or in the public sector, such as a police office, frequently have the need to conduct surveillance on persons who are suspected criminals or on person who otherwise conduct illegal activities. The surveillance conducted is preferred to be unobtrusive and undetectable by the person who is being watched. Most surveillance activities involve the use of a motor vehicle to provide the necessary mobility of the person who is conducting the surveillance. It is therefore desirable that the vehicle in which a person is conducting surveillance work can be equipped with surveillance cameras in a concealed manner such that the person being watched would not be alerted.

It is therefore an object of the present invention to provide a vehicular surveillance system that does not have the drawbacks or shortcomings of the conventional systems.

It is another object of the present invention to provide a vehicular camera surveillance system that can be completely concealed from detection.

It is a further object of the present invention to provide a vehicular camera surveillance system that can be mounted in both an exterior mirror and an interior mirror.

It is another further object of the present invention to provide a vehicular camera surveillance system that is complete with a display panel such that information may be recorded and reviewed on the display panel.

SUMMARY OF THE INVENTION

In accordance with the present invention, a vehicular camera surveillance system that can be concealed in mirrors to prevent detection by the person being watched is provided.

In a preferred embodiment, the present invention concealed vehicular camera surveillance system is constructed by an external side view mirror that conceals a first camera therein for sending a first video signal to a recording device; an internal rearview mirror concealing a second camera therein for sending a second video signal to the recording device; a controller for controlling the first and second cameras and the recording device; and a display panel for receiving video signals from the controller and displaying the signals.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
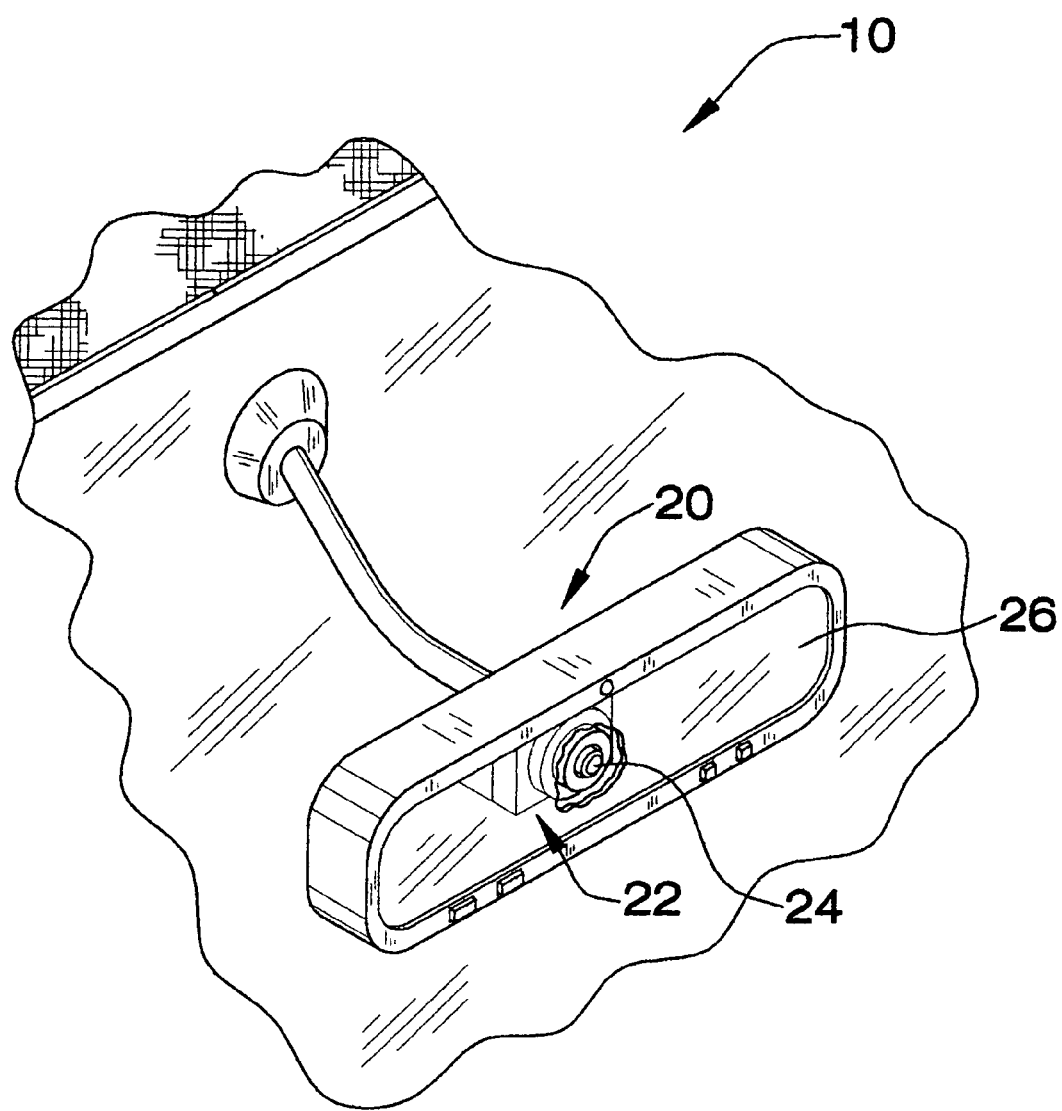
FIG. 1 is a perspective view of the present invention vehicular camera surveillance system that is installed in a rearview mirror.

The present invention discloses a vehicular camera surveillance system that can be completely concealed in a vehicle inside a rearview mirror and inside a side view mirror.

The present invention vehicular camera surveillance system is a surveillance and observation system integrated into the side view or rearview mirrors of a vehicle, for instance, either a police car or an unmarked police vehicle. The system enables a police officer to zoom in on a suspect from a safe distance, aiding in identification and capturing of wanted criminals. The present invention surveillance system is also capable of video recording a suspect in a back seat attempting to break the windows, hide contraband, or perform other illegal acts.

The present invention surveillance system consists essentially of two modified mirrors, i.e. one side view and one rearview, a camera zooming feature, a wireless controller, a monitor, video cameras, e-mail, and video recording capabilities. The mirrors generally look like typical vehicular mirrors such that they are not noticeable or detectable. The concealed surveillance capabilities are integrated into the mirrors which operate with the use of the wireless controller. The view provided by the external camera can be displayed on a 3×5 inch LCD monitor attached to the driver-side sun visor. The system further include a tape recorder for recording.

A police office can operate the external side view mirror to zoom in on suspects while parked at a distance. The monitor would provide a clear view of the area for the officer. With 10× or 15× zooming capability, a steady image can be provided with a large field of view, making spotting suspects easier. The high capacity zooming capabilities enable the office to discern even the slightest details, even under critical poor lighting conditions.

The present invention surveillance system further utilizes internal rearview mirror which includes a hidden camera directed into the back seat at suspects seated in the back seat. This automatically record the captured suspect attempting to kick out the windows, hiding drugs, spouting a confession, or verbally assaulting the officer. A zooming capability is also available with the built-in video recording system, if desired.

The present invention surveillance system is ideal for police officers, private detectives, and other engaged in surveillance or security. It increases the potential for detecting and identifying criminals from a distance so they could be digitally recorded, arrested, and prosecuted in a court of law.

The present invention surveillance system fulfills the need for viewing and recording suspects from a distance. The appealing features of the system is its convenience, safety, and effectiveness. Instead of a police officer becoming frustrated with the inability to clearly watch a suspect from a distance, the system could zoom in for a clear view. This further brings the officers view close to the home, car, or person without actually parking nearby. It allows surveillance to be effectively performed without being noticed or suspected, thereby increasing the changes of identifying and capturing wanted fugitives. With the capability of video recordings producing photographic evidence, criminals can be effectively identified and prosecuted in a court of law. This saves time and effort by the police and the court system, while also removing dangerous criminals from the streets. In addition, the present invention surveillance system is discreet, reliable, and cost effective.

Referring initially to FIG. 1, wherein a perspective view of the present invention surveillance system 10 in the form on an internal rearview mirror 20 is shown. The internal rearview mirror 20 conceals a camera 22 therein the camera 22 is equipped with a lens 24 and sends out a video signal first to a controller 50 (shown in FIG. 4), and then to a video recorder 60 (shown in FIG. 5). The video recorder, due to its larger physical size, can be conveniently mounted in a concealed location, such as in the glove box, in the trunk, or under the dashboard.

Figure 2:
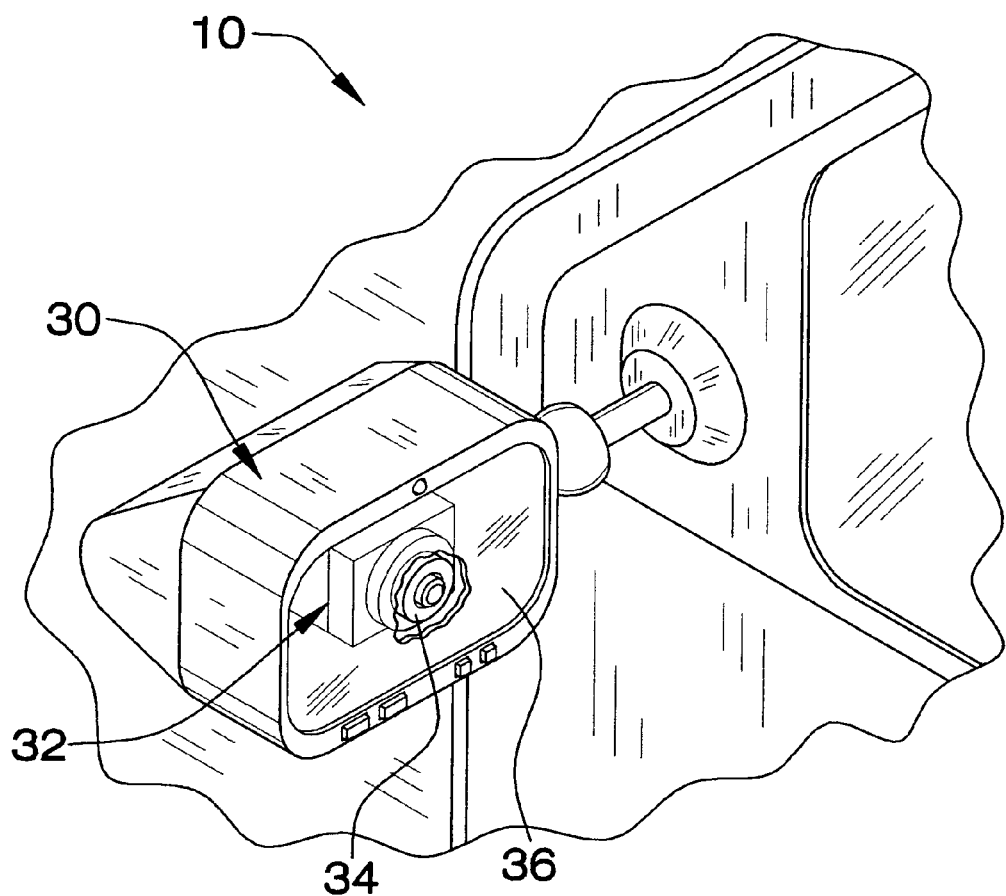
FIG. 2 is a perspective view of the present invention vehicular camera surveillance system installed in an external side view mirror.
Figure 3:
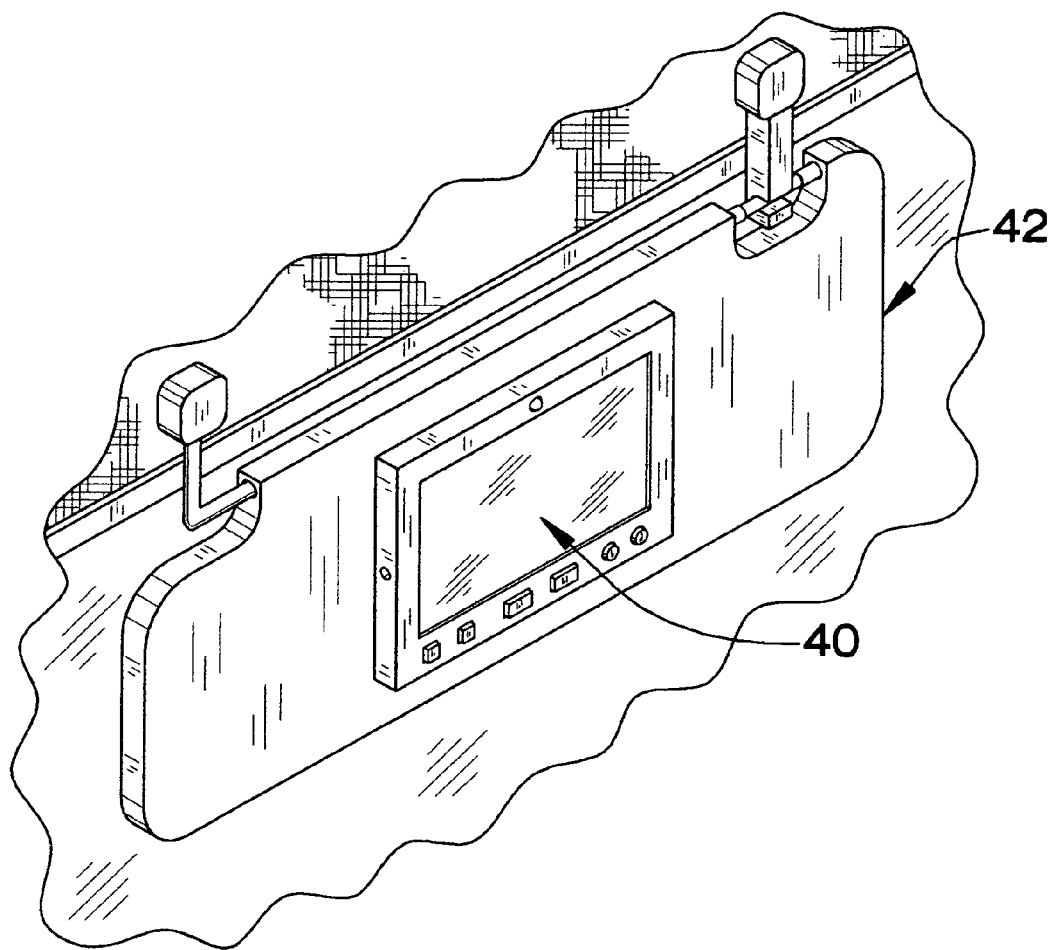
FIG. 3 is a perspective view of a display panel used in the present invention surveillance system.
Figure 4:
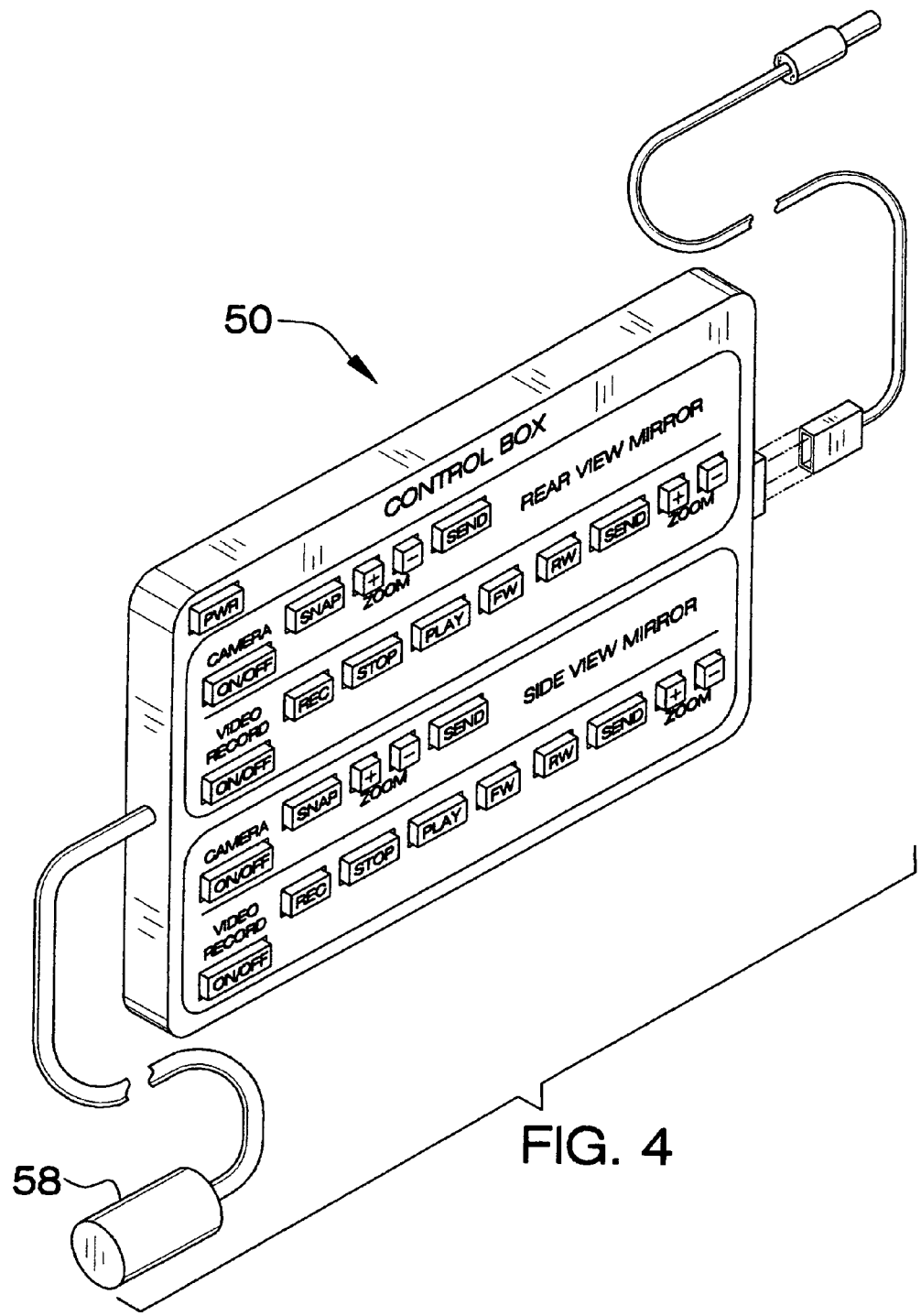
FIG. 4 is a perspective view of the controller used in the present invention surveillance system.

The present invention vehicular camera surveillance system 10 further includes an external side view mirror 30, shown in FIG. 2, which has a concealed camera 32 mounted therein behind a mirror 36. The camera 32 records image through a lens 34. The camera 32 behind the mirror 36 sends a video signal to the video recorder 60. The video recorder 60 therefore should have multi channel recording capability such that signals from both the camera 22 and 32 may be recorded simultaneously. FIG. 4 illustrates a perspective view of the present invention controller 50 which controls both the camera 32 and the side view mirror 30, and the camera 22 in the rearview mirror 20. The electrical power to the cameras, or to the controller 50 may be provided from the cigarette lighter plug in the vehicle. For instance, plug 58 for the controller 50 may be plugged into a cigarette lighter plug for providing power to the controller 50. The controller 50 further sends video signals to a display panel 40, shown in FIG. 3 which may be advantageously mounted on a sun visor 42. The display panel 40 may also be powered by the vehicle battery system and receives video signals from the controller 50 such that a person conducting surveillance may immediately review the video, either in real time or after it is recorded by the video recorder 60.

Figure 5:
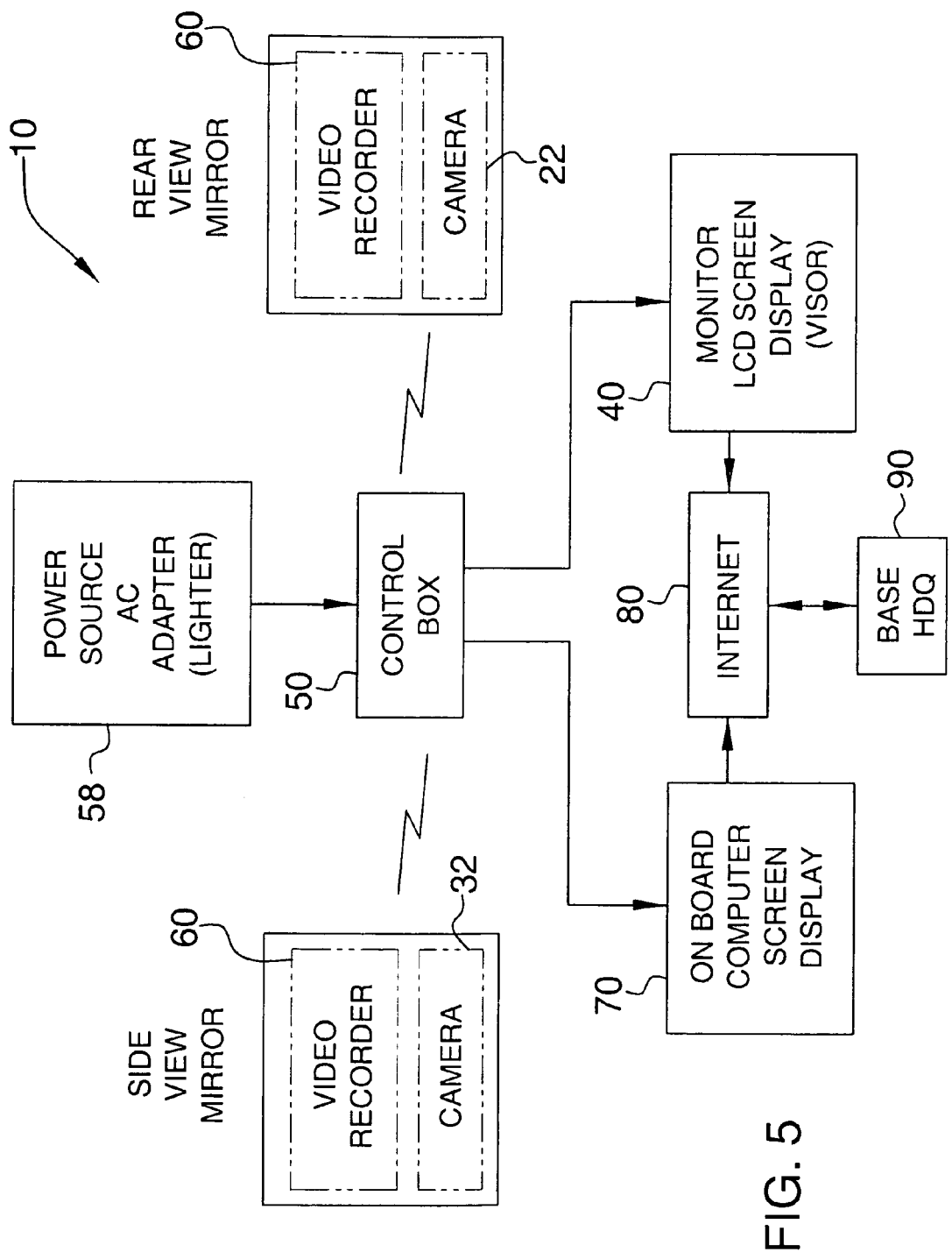
FIG. 5 is a functional, block diagram illustrating how the various components of the present invention surveillance system are connected.

FIG. 5 is a functional block diagram illustrating the electrical circuit connections between the relevant components in the present invention surveillance system 10. It is shown that the controller 50 may further be connected to an on-board computer 70, and then to internet 80 which is in communication with the base headquarter 90.

The present invention concealed vehicular camera surveillance system has therefore been amply described in the above descriptions and in the appended drawings of FIGS. 1-5.

While the preferred embodiments of the invention have been described above, it will be recognized and understood that various modifications can be made in the invention and the appended claims are intended to cover all such modifications which may fall within the spirit and scope of the invention.

The invention claimed is:

1. A concealed vehicular camera surveillance system comprising:
    an external side view mirror concealing a first camera therein for sending first video signal to a recording device;
    an internal rearview mirror concealing a second camera therein for sending a second video signal to said recording device;
    a controller for controlling said first and second cameras and said second recording device; and
    a display panel for receiving video signals from said controller and said signals, said display panel is mounted on the back of a sun visor such that said display panel is concealed when the sun visor is in a stowed position.

2. The concealed vehicular camera surveillance system according to claim 1 further comprising a video recording device mounted in said vehicle.

3. The concealed vehicular camera surveillance system according to claim 1, wherein said first and second cameras having the capabilities of taking still photos or videos.

4. The concealed vehicular camera surveillance system according to claim 1, wherein said system is powered by the vehicle battery.

5. The concealed vehicular camera surveillance system according to claim 1, wherein said system is electrically connected to the cigarette lighter plug of the vehicle.

6. The concealed vehicular camera surveillance system according to claim 1, wherein said external side view mirror further comprise a video recorder mounted therein.

7. The concealed vehicular camera surveillance system according to claim 1, wherein said internal rearview mirror further comprising a video recorder mounted therein.

* * * * *